United States Patent
Van Hasselt et al.

(10) Patent No.: US 7,452,516 B2
(45) Date of Patent: Nov. 18, 2008

(54) DISTRIBUTION DEVICE

(75) Inventors: Bastiaan Willem Van Hasselt, Amsterdam (NL); Bastiaan Leonard Johan Pieter Kikkert, Amsterdam (NL); Johannis Desiderius Stolwijk, Amsterdam (NL); Peter Mervyn Wilkinson, Amsterdam (NL); Marjanne Clara Zonnevylle, Amsterdam (NL)

(73) Assignee: Shell Oil Company, Houston, TX (US)

( * ) Notice: Subject to any disclaimer, the term of this patent is extended or adjusted under 35 U.S.C. 154(b) by 740 days.

(21) Appl. No.: 10/921,146

(22) Filed: Aug. 18, 2004

(65) Prior Publication Data
US 2005/0077635 A1 Apr. 14, 2005

(30) Foreign Application Priority Data
Aug. 18, 2003 (EP) .................................. 03255111

(51) Int. Cl.
*B01J 8/44* (2006.01)
*B01D 47/00* (2006.01)
*F02M 29/04* (2006.01)

(52) U.S. Cl. ........................... 422/311; 261/19; 261/20; 261/75; 261/100; 261/101; 261/103; 261/106; 261/108; 261/109; 261/110; 261/113; 261/114.1; 261/114.2; 261/114.5

(58) Field of Classification Search ................... 210/19, 210/20, 38, 42, 43, 44.1, 44.2, 49, 50.1, 58, 210/61, 100, 101, 103, 106, 114.1, 115, 114.2, 210/114.3, 114.4, 114.5, 126; 422/311; 261/19, 261/20, 75, 108, 109, 110, 113, 114.1, 114.2, 261/114.5, 100, 101, 103, 106; 202/82, 85
See application file for complete search history.

(56) References Cited

U.S. PATENT DOCUMENTS

| 3,186,935 A |   | 6/1965  | Vaell        | 208/59  |
|-------------|---|---------|--------------|---------|
| 3,195,987 A |   | 7/1965  | Hardison     | 23/288  |
| 3,235,344 A | * | 2/1966  | Dreyer et al.| 422/191 |
| 3,365,388 A |   | 1/1968  | Scott, Jr.   | 208/59  |
| 3,413,216 A |   | 11/1968 | Doumani      | 208/216 |
| 3,425,810 A | * | 2/1969  | Scott, Jr.   | 422/191 |

(Continued)

FOREIGN PATENT DOCUMENTS

CA       2079421       4/1993

(Continued)

*Primary Examiner*—Walter D Griffin
*Assistant Examiner*—Huy-Tram Nguyen

(57) ABSTRACT

The invention relates to a distribution device (1) for distributing liquid over an underlying catalyst bed comprising a horizontal collection tray (2) provided with at least one gas chimney (3) for upward or downward passage of gas and with liquid dosing nozzles (4) for downward passage of liquid, wherein the gas chimney(s) (3) and liquid doing nozzles (4) are separate from each other and do not have the same longitudinal axis, and wherein each liquid dosing nozzle (4) comprises a concentrically arranged liquid passing hole (5) and splash plate (6), wherein the splash plate (6) is located below the liquid passing hole (5) and below the collection tray (2) such that there is a free fall distance for liquid of at least 100 mm between the hole (5) and the splash plate (6).

The invention further relates to a reactor for hydroprocessing comprising such distribution device (1), the use of such reactor for hydroprocessing and a process for hydrocracking or hydrotreating in such reactor.

41 Claims, 1 Drawing Sheet

U.S. PATENT DOCUMENTS

| | | | |
|---|---|---|---|
| 3,461,061 A | 8/1969 | Stine et al. | 208/57 |
| 3,524,731 A * | 8/1970 | Effron et al. | 422/220 |
| 3,598,539 A * | 8/1971 | Pizzato | 422/220 |
| 3,607,723 A | 9/1971 | Peck et al. | 208/59 |
| 3,630,887 A | 12/1971 | Mounce et al. | 208/100 |
| 3,671,420 A | 6/1972 | Wilson et al. | 208/61 |
| 3,702,238 A * | 11/1972 | Armstead et al. | 422/113 |
| 3,767,562 A | 10/1973 | Sze et al. | 208/57 |
| 3,788,976 A | 1/1974 | Kirk, Jr. | 208/89 |
| 3,824,081 A | 7/1974 | Smith et al. | 23/284 |
| 3,897,329 A | 7/1975 | Franz et al. | 208/210 |
| 4,021,330 A | 5/1977 | Satchell, Jr. | 208/89 |
| 4,126,539 A * | 11/1978 | Derr et al. | 208/108 |
| 4,138,327 A | 2/1979 | Scott | 208/146 |
| 4,140,625 A * | 2/1979 | Jensen | 208/146 |
| 4,194,964 A | 3/1980 | Chen | 208/108 |
| 4,380,529 A * | 4/1983 | Gupta | 422/220 |
| 4,385,033 A | 5/1983 | Gupta | 422/217 |
| 4,705,621 A | 11/1987 | Penick | 208/146 |
| 4,708,852 A | 11/1987 | Helbling, Jr. et al. | 422/195 |
| 4,755,281 A | 7/1988 | Penick | 208/108 |
| 4,820,455 A | 4/1989 | Kunesh | 261/96 |
| 4,836,989 A | 6/1989 | Aly et al. | 422/195 |
| 5,110,444 A | 5/1992 | Haun et al. | 208/89 |
| 5,114,562 A | 5/1992 | Haun et al. | 208/89 |
| 5,252,198 A | 10/1993 | Harrison | 208/208 |
| 5,554,275 A | 9/1996 | Harandi | 208/213 |
| 5,670,116 A | 9/1997 | Gupta | 422/191 |
| 5,799,877 A | 9/1998 | Gupta et al. | 239/8 |
| 5,906,729 A | 5/1999 | Chou | 208/89 |
| 5,928,497 A | 7/1999 | Iaccino | 208/212 |
| 5,942,197 A | 8/1999 | Gupta et al. | 422/191 |
| 6,093,373 A | 7/2000 | Darmancier et al. | 422/220 |
| 6,123,323 A * | 9/2000 | Yoneda et al. | 261/96 |
| 6,180,068 B1 | 1/2001 | Boyd et al. | 422/195 |
| 6,689,329 B2 * | 2/2004 | Gupta et al. | 422/191 |

FOREIGN PATENT DOCUMENTS

| | | |
|---|---|---|
| DE | 3939267 | 5/1991 |
| EP | 207673 | 1/1987 |
| EP | 287234 | 10/1988 |
| EP | 827765 | 3/1998 |
| EP | 905216 | 3/1999 |
| EP | 715544 | 9/1999 |
| JP | 56/005101 | 1/1981 |
| JP | 58/109591 | 6/1983 |
| WO | 95/05893 | 3/1995 |
| WO | 97/46303 | 12/1997 |
| WO | 98/07805 | 2/1998 |
| WO | 98/07808 | 2/1998 |
| WO | 98/40449 | 9/1998 |
| WO | 99/00181 | 1/1999 |
| WO | 99/00182 | 1/1999 |
| WO | 00/34416 | 6/2000 |
| WO | 00/42130 | 7/2000 |
| WO | 01/16256 | 3/2001 |

* cited by examiner

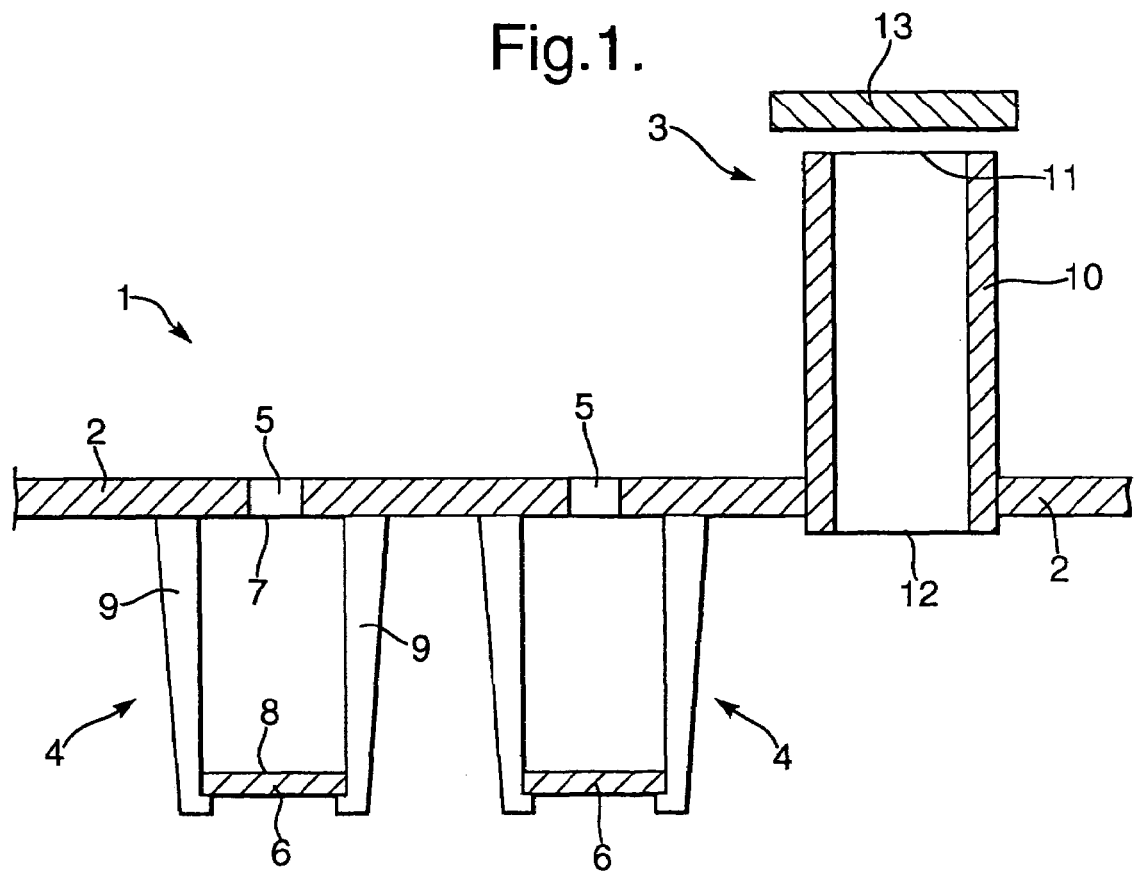
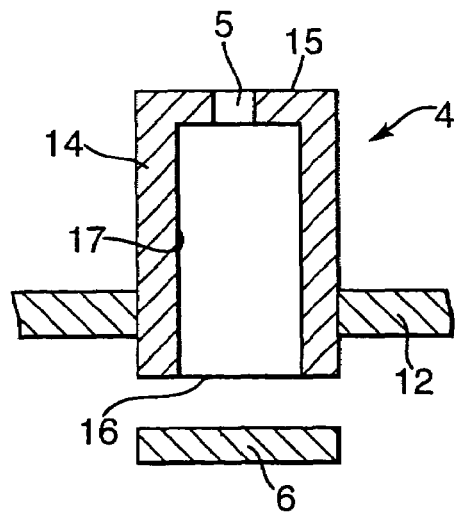

DISTRIBUTION DEVICE

FIELD OF THE INVENTION

The present invention relates to a distribution device for distributing liquid over an underlying catalyst bed, a reactor for hydroprocessing comprising such distribution device, the use of such reactor for hydroprocessing and a process for hydrocracking or hydrotreating in such reactor.

BACKGROUND OF THE INVENTION

In a trickle flow reactor, liquid trickles through one reaction bed or through a number of reaction beds arranged one below the other and gas flows co-currently or counter-currently with the liquid through the reaction bed(s). Such reactors are used in the chemical industry and in the petroleum refining industry for hydrocarbon processing, especially hydroprocessing such as catalytic dewaxing, hydrotreating and hydrocracking. Reference herein to hydrotreating is to hydroprocessing under relatively mild process conditions, for example hydrodesulphurisation, hydrodenitrogenation, hydrogenation or hydrofinishing.

Such a reactor comprises at least one reaction bed, typically a bed of catalyst particles, resting upon a support grid. Liquid effluent, formed in the reactions occurring in the catalyst bed, flows through the support grid to the subsequent catalyst bed or reactor outlet.

Such reactors typically contain a distribution device to distribute the liquid entering the reactor via the reactor inlet homogeneously over the upper reaction bed or to distribute the liquid effluent of a reaction bed homogeneously over the next lower reaction bed.

Distributor trays wherein gas and liquid pass co-currently through the same downcomer(s) are known in the art. Reference is made to U.S. Pat. Nos. 6,180,068, 4,836,989, EP 715 544, U.S. Pat. Nos. 4,140,625 and 6,093,373. In U.S. Pat. No. 6,093,373 for example, an apparatus for mixing vapour and liquid reactants within a column is disclosed. The apparatus comprises a final distributor tray consisting of a plurality of chimneys designed to create shear between the gas and liquid phases.

Disadvantages of trays wherein gas and liquid pass through the same downcomer is that they are not suitable to operate under conditions wherein there is no or a very low gas pressure drop across the tray and that they are not suitable for countercurrent operation, i.e. for operation wherein the gaseous and liquid reactants flow countercurrently with respect to each other.

In U.S. Pat. No. 5,799,877, a distributor tray is disclosed that comprises a plurality of gas and liquid spray distributors. Each gas and liquid spray distributor has separated gas and liquid conduits. In each distributor, the gas and liquids conduits are co-axial, i.e. having the same longitudinal axis, with the liquid conduit surrounding at least part of the gas conduit to define an annular space for downward liquid flow. The gas exits its conduit as a gas core surrounded by downflowing liquid. The gas expands and contacts the surrounding liquid to spray it on the catalyst bed below. A splash plate is located below the gas and liquid exit of each distributor to assist in distributing the downflowing liquid spray across the catalyst bed below.

The tray disclosed in U.S. Pat. No. 5,799,877 is a distributor tray for cocurrent gas and liquid flow, since the downflowing gas is needed to create a liquid spray. The tray is not suitable for countercurrent operation.

In WO 99/00182 a distributor tray for a countercurrently operated hydroprocessing reactor is disclosed. Liquid is distributed over the underlying reaction bed by means of a distribution tray having a plurality of short tubes for liquid passage. Gas vents in the tray allow passage of the upward moving treat gas. A disadvantage of the distribution tray disclosed in WO 99/00182 is that the liquid will not be spread over the whole surface area of the underlying catalyst bed.

There is a need in the art for a distribution device that can achieve uniform spreading of the liquid over the underlying reaction bed, both in co-current and in countercurrent operation.

SUMMARY OF THE INVENTION

It has now been found that liquid can be effectively distributed over an underlying catalyst bed, both in co-current and countercurrent operation, by a distribution tray having separate passages for gas and liquid, wherein the liquid passages comprise a liquid passing hole and a splash plate with a free fall distance of at least 100 mm between the passing hole and the splash plate.

Accordingly, the present invention relates to a distribution device for distributing liquid over an underlying catalyst bed comprising a horizontal collection tray provided with at least one gas chimney for upward or downward passage of gas and with liquid dosing nozzles for downward passage of liquid, wherein the gas chimney(s) and liquid dosing nozzles are separate from each other and do not have the same longitudinal axis, and wherein each liquid dosing nozzle comprises a concentrically arranged liquid passing hole and splash plate, wherein the splash plate is located below the liquid passing hole and below the collection tray such that there is a free fall distance for liquid of at least 100 mm between the hole and the splash plate.

It is an advantage of the distribution device according to the invention that no downward gas momentum is needed to achieve uniform liquid distribution. Therefore, the distribution device can suitably be used under counter-current process conditions or under co-current process conditions with no or very low gas pressure drop across the tray.

In a further aspect, the invention relates to a reactor for hydroprocessing comprising vertically spaced apart reaction beds and a distribution device as hereinbefore defined above at least one bed. The invention further relates to the use of such reactor for hydroprocessing.

Finally, the invention relates to a process for hydrocracking or hydrotreating wherein a liquid hydrocarbonaceous feedstock is contacted with a catalyst in the presence of hydrogen at elevated temperature and pressure in a reactor as hereinbefore defined.

BRIEF DESCRIPTION OF THE DRAWINGS

Two embodiments of the invention are described in detail and by way of example with reference to schematic FIGS. 1 and 2.

FIG. 1 shows a longitudinal section of part of a first embodiment of the distribution device of the invention.

FIG. 2 shows a longitudinal section of a second embodiment of the liquid dosing nozzle of the distribution device of the invention.

DETAILED DESCRIPTION OF THE INVENTION

Under normal operation of the distribution device according to the invention, liquid collected on the collection tray passes downwardly through the liquid dosing nozzles. Each liquid dosing nozzle comprises a liquid passing hole and a splash plate. The liquid passing hole and the splash plate are arranged concentrically with respect to each other, which means that they have the same longitudinal axis. They are arranged in such way that the passing liquid can fall freely between the passing hole and the splash plate, i.e. the liquid jet does not touch a nozzle wall or other structure before impinging on the splash plate. Thus, the passing liquid gains maximum momentum. Upon impingement of the splash plate, the liquid forms a broad film or droplet spray. Impingement of overlapping films or sprays from neighbouring liquid dosing nozzles provides a high liquid distribution uniformity. The splash plate is located under the tray and at least 100 mm below the liquid passing hole. The liquid passing hole will typically be located in or above the collection tray, although it may be located below the tray.

The distribution device according to the invention comprises at least one gas chimney for upward or downward passage of gas. The gas chimney(s) and the liquid dosing nozzles are separate from each other and do not have the same longitudinal axis. In order to minimise disturbance of the liquid film or spray by the gas flow, the distance between the longitudinal axes of gas chimneys and liquid dosing nozzles that are adjacent to each other is preferably at least 100 mm.

The free fall distance for liquid, i.e. the distance between the liquid passing hole and the splash plate, is at least 100 mm, preferably in the range of from 100 to 500 mm, more preferably of from 200 to 300 mm. Reference herein to the distance between the liquid passing hole and the splash plate is to the distance between the lower end of the hole and the upper end of the splash plate. Preferably, the free fall distance for liquid is at least 5 times the diameter of the liquid passing hole, more preferably at least 10 times. In order to limit the height of the distributor tray, the free fall distance for liquid is preferably at most 50 times the diameter of the liquid passing hole.

In order to provide for a broad, umbrella-shaped film or droplet spray, the ratio between the diameter of the splash plate and the diameter of the liquid passing hole is preferably in the range of from 2 to 8. A smaller splash plate may result in liquid bypassing the splash plate. On a larger splash plate, the liquid may drip from the periphery of the splash plate without forming an umbrella-shaped film or spray. More preferably, the ratio between the diameter of the splash plate and the diameter of the liquid passing hole is in the range of from 3 to 6.

The diameter of the liquid passing hole is preferably at least 3 mm in order to avoid blockage of the holes by solid particles that may be present in the liquid stream. Preferably, the liquid passing hole has a maximum diameter of 25 mm in order to achieve a sufficiently high liquid velocity for the formation of a broad film or spray. More preferably, the liquid passing hole has a diameter in the range of from 5 to 20 mm.

The liquid passing hole may be a hole in the collection tray. Alternatively, the liquid passing hole may be a hole in the upper end of a tube extending through the collection tray.

In case that the liquid passing hole is a hole in the upper end of a tube extending through the collection tray, the diameter of the hole is smaller than the inner diameter of the tube, in order to provide for a free fall distance for the liquid jet between the hole and the splash plate. The inner diameter of the tube is at least two times the diameter of the hole. Thus, the upper end of the tube is partly closed. The lower end of the tube is open. The tube may extend above and/or below the collection tray.

The splash plate is located below the lower end of the tube. The vertical distance between the lower end of the tube and the splash plate is not critical.

Preferably, the vertical distance between the lower end of the tube and the upper end of the splash plate is at least 0.5 times the diameter of the liquid passing hole.

Preferably, the inner diameter of the tube is at most 15 times the diameter of the hole. More preferably, the inner diameter of the tube is in the range of from 2 to 6 times the diameter of the hole.

The splash plate may be attached to the collection tray or the tube by any suitable attachment means known in the art.

The distribution and density of the liquid dosing nozzles on the collection tray is preferably such that the liquid films or droplet sprays from neighbouring nozzles overlap. Therefore, the liquid dosing nozzles are preferably evenly distributed over the tray. Preferably, the distribution device has at least 25 liquid dosing nozzles per square metre of collection tray, more preferably at least 50 nozzles per square metre of collection tray. In view of the ease of construction and costs, the distribution device has preferably at most 100 liquid dosing nozzles per square metre of collection tray, more preferably at most 75.

The distribution device according to the invention may comprise a single gas chimney. Preferably, the device has a plurality of gas chimneys. The tray will typically have more liquid dosing nozzles than gas chimneys. Preferably, the ratio of liquid dosing nozzles to gas chimneys is in the range of from 2 to 5. Three liquid dosing nozzles for each gas chimney is a particularly suitable ratio. The chimneys are preferably evenly distributed over the collection tray and preferably such that the distance between the longitudinal axis of a gas chimneys and liquid dosing nozzles that are adjacent to each other is at least 100 mm. This distance is preferably at most 200 mm. The total area for gas passage is such that no undesirably high pressure drop over the collection tray is built up. In countercurrent operation, the gas passage area should be sufficient high for the prevention of flooding. The at least one gas chimney may be any gas chimney known in the art. Suitable gas chimneys are for example known from U.S. Pat. No. 3,524,731 and WO 99/00182. Gas chimneys typically comprise an open-ended tube extending through the collection tray. The tube has a first gas passage opening at its upper end, located above the collection tray, and a second gas passage opening at its lower end, located in or below the collection tray. The first gas passage opening is located above the liquid level on the collection tray during normal operation conditions and thus at a level above the liquid passing hole of the liquid dosing nozzles. Preferably, a cap or deflection plate is located above the first gas passage opening in order to prevent liquid from passing directly through the gas chimneys. The inner diameter of the gas chimneys is preferably larger than the inner diameter of the liquid passing holes.

The distribution device according to the invention is preferably applied in a multiple bed hydroprocessing reactor. Accordingly, the invention further relates to reactor for hydroprocessing comprising vertically spaced apart reaction beds, preferably beds of catalyst particles, and a distribution device as hereinbefore defined above at least one bed, preferably above each bed.

The distribution device may be placed above the upper catalyst bed of the reactor to distribute the liquid feed supplied by the reactor inlet to the first catalyst bed. The device may also be placed between subsequent catalyst beds to distribute liquid effluent from a catalyst bed over the underlying catalyst bed.

The distance between the splash plates of the distribution device and the upper surface of the underlying reaction bed is typically in the range of from 100 to 500 mm.

The reactor according to the invention is suitable for use in hydroprocessing, i.e. for the catalytic reaction of a liquid hydrocarbonaceous feed in the presence of hydrogen at elevated temperature and pressure. Suitable catalysts and process conditions for hydroprocessing are generally known in the art. Examples of suitable processes are hydrocracking, catalytic dewaxing, hydrodesulphurisation, hydrodenitrogenation, hydrogenation and hydrofinishing.

The reactor according to the invention is particularly suitable for hydroprocessing, preferably hydrotreating processes, wherein the liquid hydrocarbonaceous feedstock and the hydrogen are countercurrently supplied to the reactor.

DETAILED DESCRIPTION OF THE DRAWINGS

In FIG. 1 is shown a longitudinal section of a part of the distribution device of the invention. The distribution device 1 comprises a collection tray 2 with a gas chimney 3 for passage of gas and two liquid dosing nozzles 4 for downward passage of liquid to the underlying catalyst bed (not shown). Each nozzle 4 comprises a liquid passing hole 5 and a splash plate 6. The liquid passing hole 5 is a hole in collection tray 2. Under normal operation, liquid collected on collection tray 2 can fall freely from the lower end 7 of hole 5 to the upper end 8 of splash plate 6. Splash plate 6 is attached to collection tray 2 by attachment means 9 in such way that attachment means 9 do not hinder the liquid flow.

Gas chimney 3 comprises a tube 10 with a first 11 and second 12 gas passage opening. A deflection plate 13 is located above the first gas passage opening.

In FIG. 2 is shown a longitudinal section of a second embodiment of the liquid dosing nozzle of the distribution device of the invention. Each liquid dosing nozzle 4 comprises a tube 14 extending through collection tray 2. The tube 14 has a liquid passing hole 5 in its upper end 15 and is open at its lower end 16. The inner diameter of tube 14 is larger than the diameter of liquid passing hole 5. Thus, liquid passing through nozzle 4 can fall freely from the liquid passing hole 5 to splash plate 6, i.e. without touching the inner tube wall 17. Splash plate 6 is attached to tube 14 by attachment means (not shown).

What is claimed is:

1. A distribution device for distributing liquid over an underlying catalyst bed comprising a horizontal collection tray provided with at least one gas chimney for upward or downward passage of gas and with liquid dosing nozzles for downward passage of liquid, wherein the gas chimney(s) and liquid dosing nozzles are separate from each other and do not have the same longitudinal axis, and wherein each liquid dosing nozzle comprises a concentrically arranged liquid passing hole and splash plate, wherein the splash plate is located below the liquid passing hole and below the collection tray such that there is a free fall distance for liquid of at least 100 mm between the hole and the splash plate.

2. A distribution device according to claim 1, wherein there is at least a distance of 100 mm between the longitudinal axis of a gas chimney and an adjacent liquid dosing nozzle.

3. A distribution device according to claim 2, wherein the free fall distance for liquid is in the range of from 100 to 500 mm.

4. A distribution device according to claim 3, wherein the free fall distance for liquid is at least 5 times the diameter of the liquid passing hole.

5. A distribution device according to claim 4, wherein the ratio between the diameter of the splash plate and the diameter of the liquid passing hole is in the range of from 2 to 8.

6. A distribution device according to claim 5, wherein the liquid passing hole has a diameter in the range of from 3 to 25 mm.

7. A distribution device according to claim 6, wherein the liquid passing hole is a hole in the collection tray.

8. A distribution device according to claim 6, wherein the liquid dosing nozzles are in the form of a vertical tube extending through the collection tray, which tube is open at its lower end, wherein the splash plate is located below the lower end of the tube and the liquid passing hole is located in the upper end of the tube and the inner diameter of the tube is at least two times the diameter of the liquid passing hole.

9. A distribution device according to claim 8, wherein the vertical distance between the lower end of the tube and the upper end of the splash plate is at least 0.5 times the diameter of the liquid passing hole.

10. A distribution device according to claim 9 further comprising at least 25 liquid dosing nozzles per square meter of collection tray.

11. A distribution device according to claim 10, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

12. A distribution device according to claim 11, wherein the inner diameter of the gas chimneys is larger than the inner diameter of the liquid passing holes.

13. A distribution device according to claim 1, wherein the free fall distance for liquid is in the range of from 100 to 500 mm.

14. A distribution device according to claim 1, wherein the free fall distance for liquid is at least 5 times the diameter of the liquid passing hole.

15. A distribution device according to claim 2, wherein the free fall distance for liquid is at least 5 times the diameter of the liquid passing hole.

16. A distribution device according to claim 1, wherein the ratio between the diameter of the splash plate and the diameter of the liquid passing hole is in the range of from 2 to 8.

17. A distribution device according to claim 2, wherein the ratio between the diameter of the splash plate and the diameter of the liquid passing hole is in the range of from 2 to 8.

18. A distribution device according to claim 3, wherein the ratio between the diameter of the splash plate and the diameter of the liquid passing hole is in the range of from 2 to 8.

19. A distribution device according to claim 1, wherein the liquid passing hole has a diameter in the range of from 3 to 25 mm.

20. A distribution device according to claim 2, wherein the liquid passing hole has a diameter in the range of from 3 to 25 mm.

21. A distribution device according to claim 3, wherein the liquid passing hole has a diameter in the range of from 3 to 25 mm.

22. A distribution device according to claim 4, wherein the liquid passing hole has a diameter in the range of from 3 to 25 mm.

23. A distribution device according to claim 1, wherein the liquid passing hole is a hole in the collection tray.

24. A distribution device according to claim 2, wherein the liquid passing hole is a hole in the collection tray.

25. A distribution device according to claim 3, wherein the liquid passing hole is a hole in the collection tray.

26. A distribution device according to claim 4, wherein the liquid passing hole is a hole in the collection tray.

27. A distribution device according to claim 5, wherein the liquid passing hole is a hole in the collection tray.

28. A distribution device according to claim 1, wherein the liquid dosing nozzles are in the form of a vertical tube extending through the collection tray, which tube is open at its lower end, wherein the splash plate is located below the lower end of the tube and the liquid passing hole is located in the upper end of the tube and the inner diameter of the tube is at least two times the diameter of the liquid passing hole.

29. A distribution device according to claim 2, wherein the liquid dosing nozzles are in the form of a vertical tube extending through the collection tray, which tube is open at its lower end, wherein the splash plate is located below the lower end of the tube and the liquid passing hole is located in the upper end of the tube and the inner diameter of the tube is at least two times the diameter of the liquid passing hole.

30. A distribution device according to claim 3, wherein the liquid dosing nozzles are in the form of a vertical tube extending through the collection tray, which tube is open at its lower end, wherein the splash plate is located below the lower end of the tube and the liquid passing hole is located in the upper end of the tube and the inner diameter of the tube is at least two times the diameter of the liquid passing hole.

31. A distribution device according to claim 4, wherein the liquid dosing nozzles are in the form of a vertical tube extending through the collection tray, which tube is open at its lower end, wherein the splash plate is located below the lower end of the tube and the liquid passing hole is located in the upper end of the tube and the inner diameter of the tube is at least two times the diameter of the liquid passing hole.

32. A distribution device according to claim 5, wherein the liquid dosing nozzles are in the form of a vertical tube extending through the collection tray, which tube is open at its lower end, wherein the splash plate is located below the lower end of the tube and the liquid passing hole is located in the upper end of the tube and the inner diameter of the tube is at least two times the diameter of the liquid passing hole.

33. A distribution device according to claim 1, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

34. A distribution device according to claim 2, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

35. A distribution device according to claim 3, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

36. A distribution device according to claim 4, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

37. A distribution device according to claim 5, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

38. A distribution device according to claim 6, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

39. A distribution device according to claim 7, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

40. A distribution device according to claim 8, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

41. A distribution device according to claim 9, wherein each gas chimney comprises a tube extending through the collection tray, the tube having a first gas passage opening located above the collection tray and a second gas passage opening located in or below the collection tray, wherein the first gas passage opening is located at a level above the liquid passing hole of the liquid dosing nozzles.

* * * * *